United States Patent [19]
Okita

[11] Patent Number: 4,688,440
[45] Date of Patent: Aug. 25, 1987

[54] MEMBER FOR INTERMITTENT FEED MOTION

[75] Inventor: Masao Okita, Furukawa, Japan

[73] Assignee: Alps Electric Co., Ltd., Japan

[21] Appl. No.: 607,467

[22] Filed: May 7, 1984

[30] Foreign Application Priority Data

May 7, 1983 [JP] Japan .............................. 58-67395[U]

[51] Int. Cl.⁴ ........................ F16H 19/02; F16H 25/20
[52] U.S. Cl. .................................. 74/89.15; 74/84 R; 74/424.8 R; 74/426; 74/459; 360/106
[58] Field of Search ............. 74/84 R, 89.15, 424.8 R, 74/426, 458, 459; 360/106

[56] References Cited

U.S. PATENT DOCUMENTS

| | | | |
|---|---|---|---|
| 1,384,541 | 7/1921 | Schmick | 74/458 |
| 1,384,543 | 7/1921 | Schmick | 74/458 |
| 1,482,622 | 2/1924 | Schmick | 74/458 |
| 1,989,611 | 1/1935 | Dall et al. | 74/459 |
| 3,693,982 | 9/1972 | Barnett et al. | 360/106 |
| 3,710,359 | 1/1973 | Sawada et al. | 360/106 |
| 4,131,923 | 12/1978 | Wachs et al. | 360/106 |
| 4,185,312 | 1/1980 | Bjordahl | 360/106 |
| 4,333,116 | 6/1982 | Schoettle et al. | 360/109 |
| 4,383,283 | 5/1983 | Machut | 360/106 |

Primary Examiner—Lawrence Staab
Attorney, Agent, or Firm—Guy W. Shoup

[57] ABSTRACT

An intermittent feed member adapted for an intermittent feed mechanism comprises a shaft provided having a plurality of individually groove portions which are formed in its outer periphery along the circumferential direction. Each of the groove portions has a bottom portion extending straightwardly. These groove portions have a rather small lead angle and are successively staggered axially so that their inside portions may communicate with one another, whereby a single helical groove is formed.

2 Claims, 5 Drawing Figures

MEMBER FOR INTERMITTENT FEED MOTION

FIELD OF THE INVENTION

The present invention relates to an intermittent feed member provided with a helical groove and adapted for use in an intermittent feed mechanism, for example.

BACKGROUND OF THE INVENTION

Referring first to FIG. 1, a feed mechanism equipped with a threaded member 4 is schematically shown. This mechanism further includes an electric motor 1, a bearing 2, and a coupling gearing 3. The threaded member 4 is mounted between the motor 1 and the bearing 2, and is rotated by the motor in forward or reverse direction via the gearing 3. A guide bar 5 is mounted parallel to the threaded member 4, and a moving member 6 is mounted over the bar 5 such that the member 6 can make a sliding motion along the bar. A leaf spring 7 depends from the bottom of the moving member 6 and has a pointed portion 8 at its end. This portion 8 is fitted into a helical groove 9 formed in the periphery of the threaded portion 4 so that the portion 8 may slide within the groove. Thus, the moving member 6 can be reciprocated within a certain region while guided by the guide bar 5 by rotating the threaded member 4 in forward or reverse direction.

When it is desired to drive the moving member 6 intermittently in given steps, the motor 1 is energized intermittently to rotate the threaded member 4 in a stepwise way, whereby the moving member 6 is advanced in a given direction.

The conventional intermittent feed member, i.e., the threaded member 4, of the feed mechanism is so designed that the helical groove 9 has the same lead angle $\theta$ over the whole length, as shown in FIG. 2, and that if the groove 9 is developed onto a plane, it forms a straight line. Therefore, if it is desired to stop the movement of the moving member 6 in stepwise manner at eight angular positions 0°, 45°, 90°, 135°, 180°, 225°, 270°, and 315°, the unevenness of the helix of the threaded member 4 or error of control over the rotation displaces the moving member 6 from its proper position proportionately, so that the member 6 may not stop at correct positions, thus imparing the reliability. Further, since the error of control over the rotation tends to produce an error in the quantity of feed as described above, an accurate and hence expensive motor must be used.

SUMMARY OF THE INVENTION

It is the main object of the present invention to provide an intermittent feed member which is free of the foregoing difficulties with the prior art technique, is capable of improving the accuracy of positions at which the moving member of an intermittent feed mechanism stops, and permits a less accurate motor to be used in the mechanism.

This object is achieved in accordance with the teachings of the present invention by forming a plurality of groove portions having straight bottom portions in the periphery of a shaft along the circumferential direction in such a way that the lead angle is quite small and that the groove portions are successively staggered axially to constitute a single helical groove.

Other objects and features of the invention will appear in the course of description thereof which follows.

DETAILED DESCRIPTION OF THE INVENTION

Figure 3:
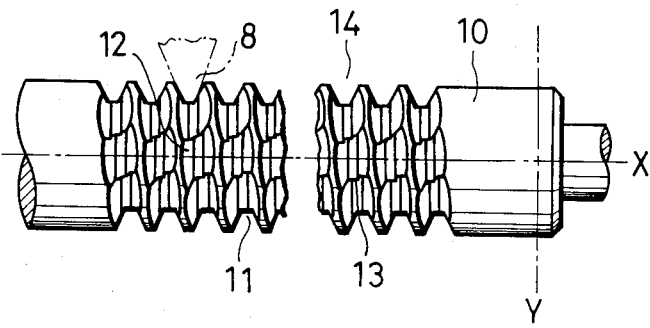
FIG. 3 is a front elevation of an intermittent feed member according to the present invention.
Figure 4:
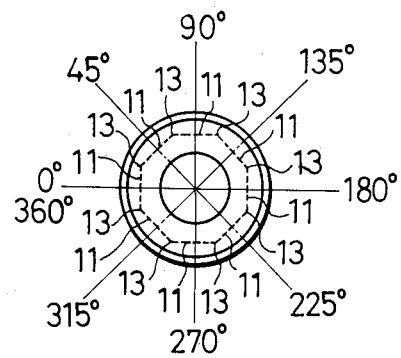
FIG. 4 is a right side elevation of the feed member shown in FIG. 3.

Referring now to FIGS. 3 and 4, there is shown a shaft 10 which is provided with a helical groove 12 in accordance with the invention. The outer periphery of the shaft 10 is provided with a plurality of groove portions 11 along the circumferential direction within a certain range. The groove portions 11 extend parallel to a line Y which is perpendicular to the axis X of the shaft 10, that is, the lead angle $\theta$ is equal to zero. It is to be noted that this lead angle is not necessarily required to be null in the present invention, but rather it can also assume a quite small value. The bottom portions of the groove portions 11 extend straight. These groove portions 11 are successively staggered axially of the shaft 10 so that the inside portions of the groove portions 11 may communicate with one another, whereby these groove portions 11 constitute the single helical groove 12. Feed portions 13 are formed in the portions which interconnect the groove portions 11 that have been made by grinding the outer periphery of the shaft 10 in this way. A moving member (described later) is advanced using the feed portions 13.

Figure 1:
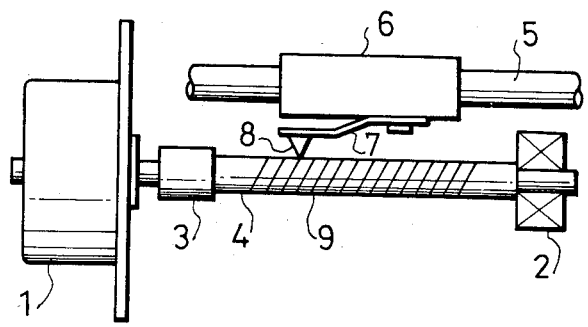
FIG. 1 is a schematic elevation of a feed mechanism.
Figure 2:
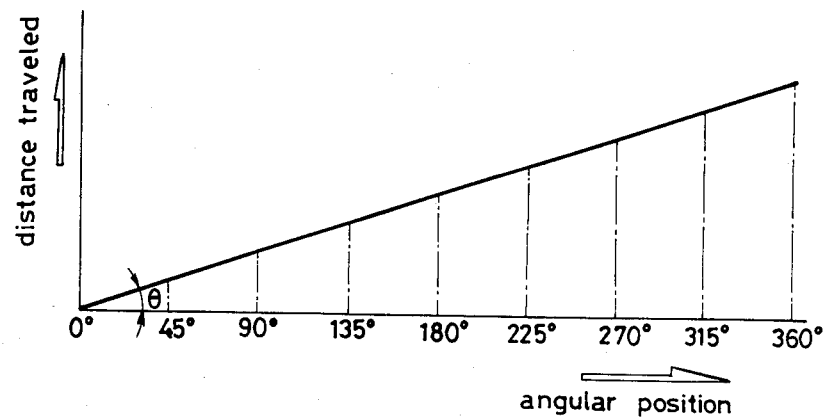
FIG. 2 is a graph illustrating the lead angle of a conventional intermittent feed member.
Figure 5:
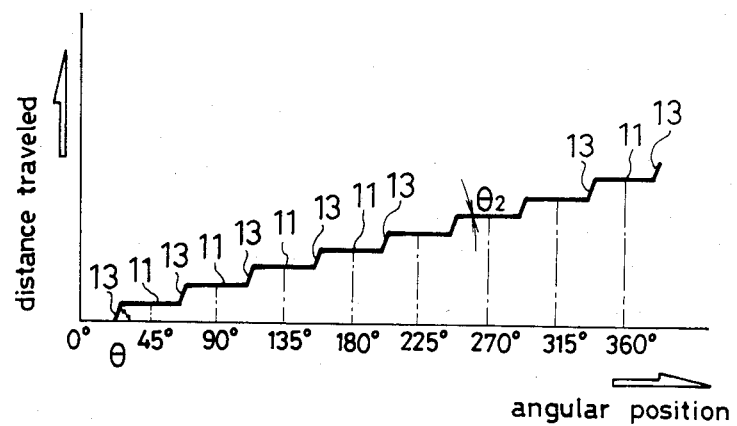
FIG. 5 is a graph illustrating the lead angle of the feed member shown in FIG. 3.

The pointed portion 8 of the moving portion 6 shown in FIG. 1 is fitted into the helical groove 12 in the intermittent feed memer 14 constructed in this way such that the portion 8 can make a sliding motion within the groove 12. In a feed mechanism equipped with this intermittent feed member 14, as the member 14 is turned, the pointed portion 8 makes a sliding motion in the feed portion 13 of one groove portion 11, causing the moving member 6 to move in a certain direction corresponding to the lead angle $\theta$. When the pointed portion 8 reaches one groove portion 11, the motor 1 is de-energized to stop the movement of the moving member 6. In this way, the moving member 6 is advanced intermittently by moving it in each feed portion 13 and halting the motion in each groove portion 11, as can be seen from FIG. 5. Since the lead angle $\theta_2$ in each groove portion 11 is zero, the moving member 6 is stopped at appropriate positions, even if the rotation of the intermittent feed member 14 involves a slight error.

Owing to the structure of the novel intermittent feed member, when it is used in an intermittent feed mechanism or the like, the accuracy of the positions at which the moving member stops can be enhanced. Further, use of an accurate and expensive motor is not needed and hence the invention is economically advantageous. In addition, since the bottom portions of the groove portions extend straight, it is easy to manufacture a helical groove consisting of these groove portions. Consequently, the intermittent feed member is easy to fabricate.

While a preferred embodiment has been described, variations thereto will occur to those skilled in the art within the scope of the present inventive concepts which are delineated by the following claims.

What is claimed is:

1. An intermittent drive mechanism comprising:
a shaft rotatable about an axis,
a spiral groove formed in the outer periphral surface of the shaft leading in one axial direction, and
a tip end portion of a movable member riding in the spiral groove,
the spiral groove having a plurality of groove portions which are discrete and separate from each other and positioned circumferentially staggered in stepwise axial increments along the spiral groove, each groove portion having a bottom wall oriented at a minimal lead angle to the axis of the shaft and inclined side walls opposing each other on each side of the bottom wall such that the tip end portion of the movable member can ride along the bottom wall of the groove guided by the inclined side walls, said bottom wall being flat, linear, and having a predetermined length in the direction transverse to said shaft axis that despite small angular movements of the shaft said tip end riding thereon can move along the length of the groove without any significant axial movement,
the spiral groove including feed portions which interconnect adjacent groove portions, said feed portions being formed as substantially discontinuous transition lines wherein said tip end portion must move into one or the other of two adjacent groove portions upon encountering a feed portion,
whereby the tip end portion is intermittently driven in stepwise axial increments along the one axial direction as it rides along successive groove portions of the spiral groove in conjunction with rotation of the shaft, the movable member is controlled to move in discrete stepwise axial increments by rotation of the shaft, and the movable member is held stably at incremental axial positions despite small angular movements of the shaft.

2. An intermittent drive mechanism according to claim 1, wherein said minimal lead angle of the bottom wall of the groove portion is essentially zero.

* * * * *